Feb. 17, 1970  J. R. ALLGOOD  3,495,455
NUCLEAR BLAST PRESSURE SIMULATOR
Filed Dec. 29, 1964  3 Sheets-Sheet 3

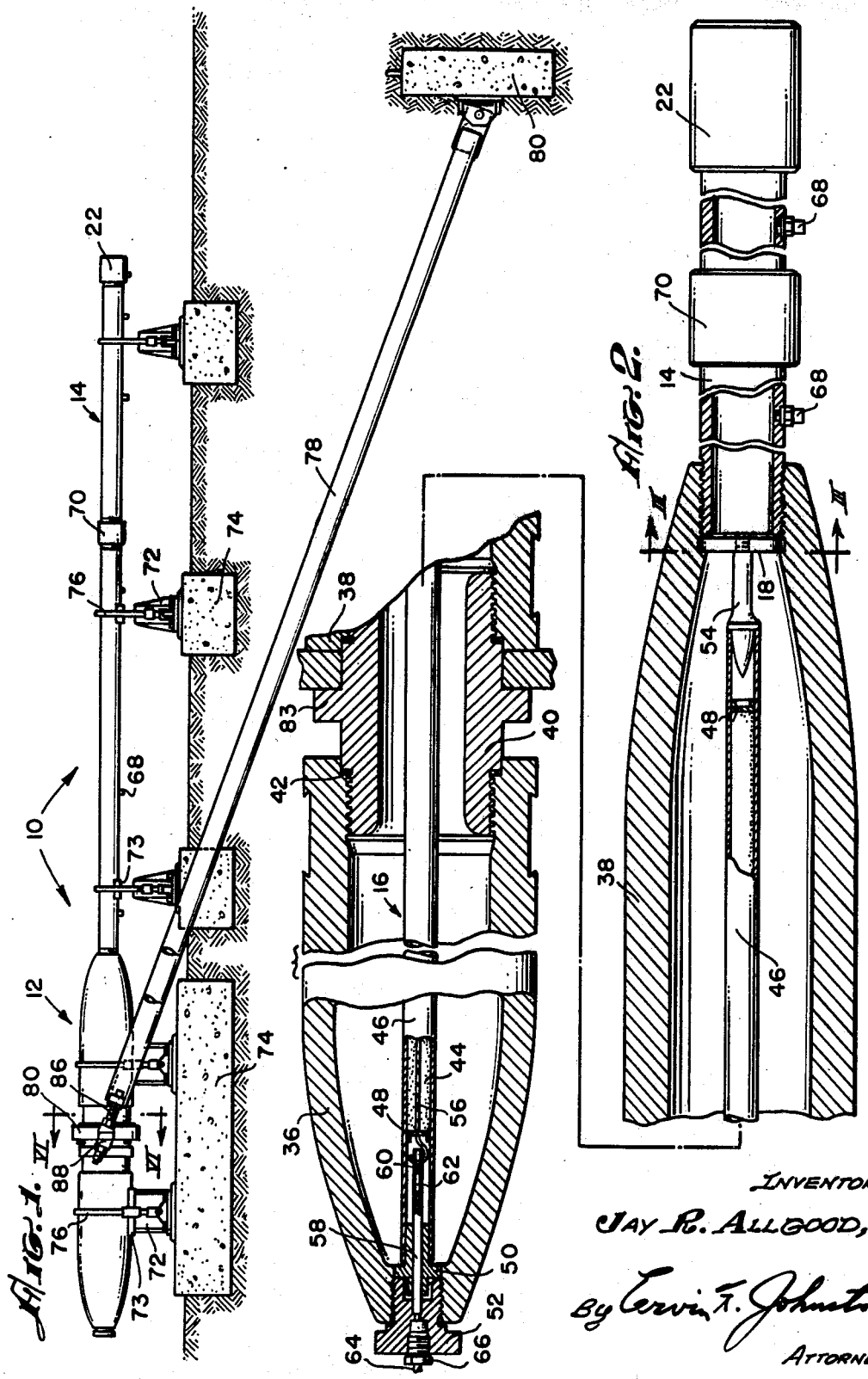

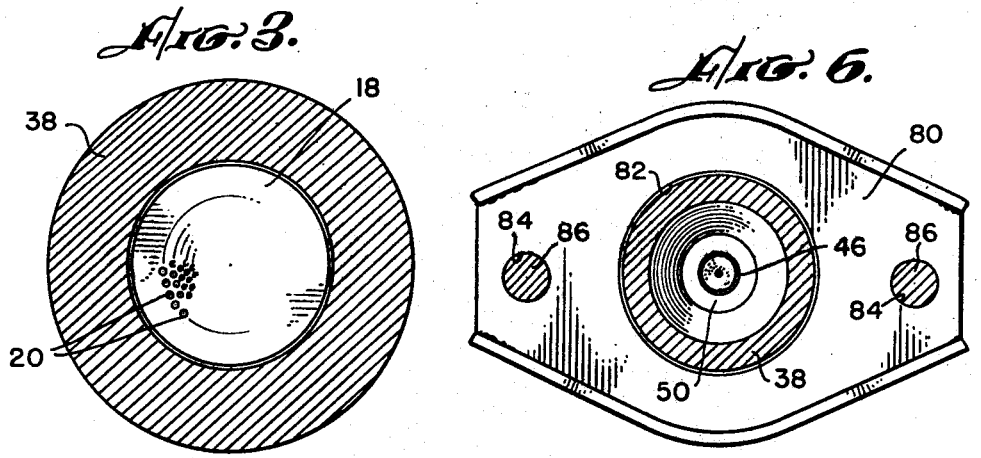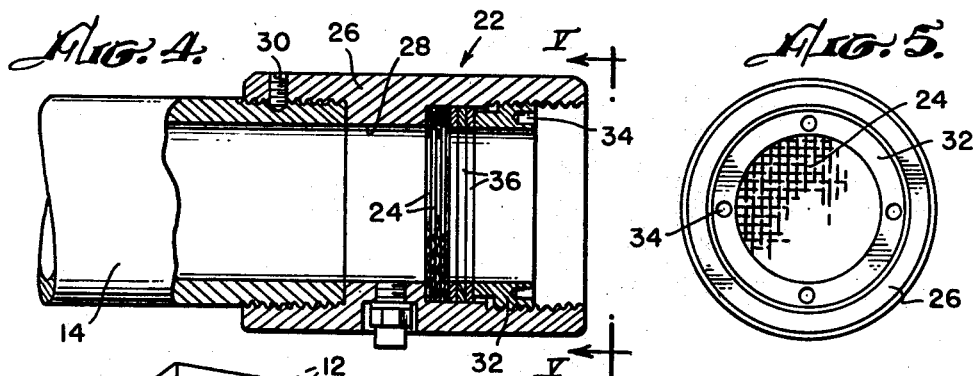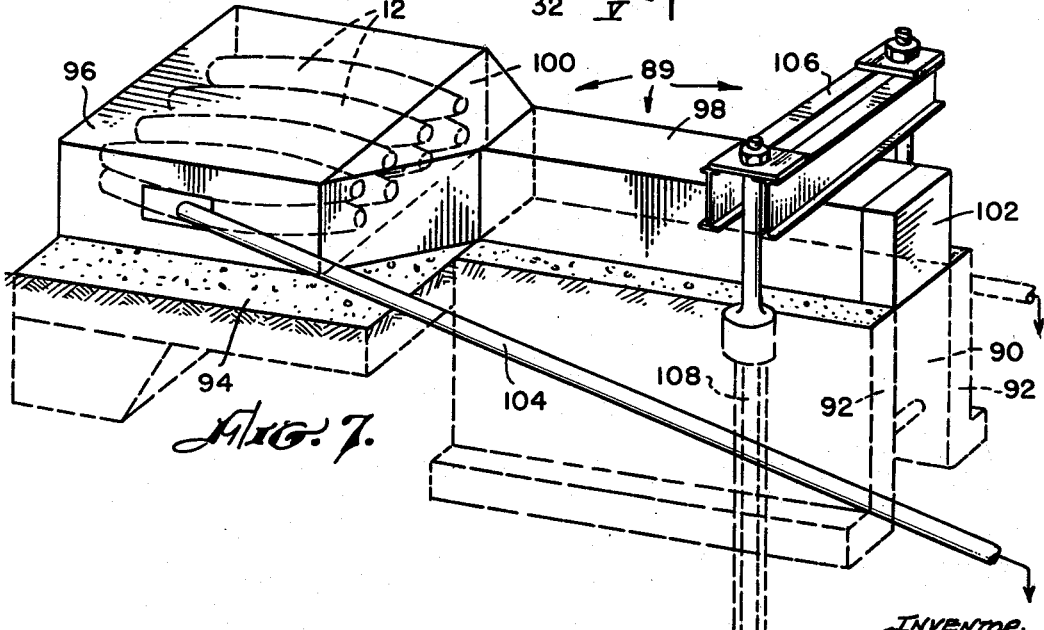

United States Patent Office 3,495,455
Patented Feb. 17, 1970

3,495,455
NUCLEAR BLAST PRESSURE SIMULATOR
Jay R. Allgood, Oxnard, Calif., assignor to the United States of America as represented by the Secretary of the Navy
Filed Dec. 29, 1964, Ser. No. 422,094
Int. Cl. G01m 9/00
U.S. Cl. 73—147
10 Claims

ABSTRACT OF THE DISCLOSURE

The invention is a nuclear blast pressure simulator which may include a detonation chamber containing an explosive charge connected to a shock tube; between the detonation chamber and the shock tube is a perforated throttle plate which is to cause a longer duration, flat fronted shock wave. At the end of the shock tube a choke comprised of several screens, the mesh of each screen becoming finer in a downstream direction, may be located to help cause a longer, predetermined pressure decay within the tube. Pressure sensing devices may be placed at any desired interval along the shock tube.

---

The invention described herein may be manufactured and used by or for the Government of the United States of America for governmental purposes without the payment of any royalties thereon or therefor.

The present invention relates to a nuclear blast pressure simulator and more particularly to an apparatus for producing long duration pressures with an ordinary explosive charge, which pressures simulate the pressures from a nuclear explosion.

Since the advent of the nuclear bomb many experiments have been conducted to make pressure studies or determine the blast effects on various types of structures. Some of these experiments have been conducted with the explosion of a nuclear device while other experiments have been conducted with a laboratory device which utilizes an ordinary explosive charge. The laboratory device obviously offers many advantages and is preferable to actual blast conditions for making pressure studies or testing small structures.

To simulate the pressure conditions of a nuclear explosion a laboratory nuclear blast simulator must be capable of producing blast pressures over a relatively long duration, in the order of 150 milliseconds to 2½ seconds. The provision of such a nuclear blast simulator, which utilizes an ordinary explosive charge, has been a problem since the duration of the pressures from the ordinary explosive charge is relatively short, normally less than 15 milliseconds. Prior art blast simulators have used a shock tube which is connected to a detonation chamber and the detonation of an explosive charge within the detonation chamber produces a shock wave or pressure front within the shock tube. The problem has been that the shock tube must be extremely long. One reason for this extreme length has been to develop a long duration pressure condition and a clean pressure front which simulates a nuclear blast. For instance, in order to develop a 100 p.s.i. pressure over a duration of 150 milliseconds a blast tube for a prior art simulator was required to have a length of 200 feet. The present invention is capable of producing blast pressures, with a clean pressure front, in the order of 1000 p.s.i. over a duration of 150 milliseconds in a blast tube which is no longer than 18 feet in length.

The present invention has accomplished this result by providing a perforated throttle plate between the detonation chamber and the shock tube. Accordingly, upon detonating an explosive charge within the detonation chamber the extremely high pressures of relatively short duration developed therein are throttled through the throttle plate so that the pressures passing to the shock tube are of a lower pressure and of a relatively long duration. Further, the present invention develops a clean or flat shock pressure front within the blast tube by constructing the perforations in the throttle plate according to a predetermined configuration. The perforations in the throttle plate may be circular in shape and located in a series of concentric rings about the center of the plate with the perforations in adjacent rings being radially offset from one another and the perforations in alternate rings being aligned with one another. Such a configuration causes the throttle plate to form pressure wavelets which will expand to form a substantially clean pressure front within the shock tube. The flatness of the pressure front has been further enhanced by constructing the perforations in an outermost ring of a slightly larger diameter than those located in the inner rings, thereby overcoming the problem of boundary layer drag of the pressure front with the shock tube.

Another advantage attributable to the present invention is accomplished by providing the shock tube with a choke means of a particular configuration at the discharge end of the shock tube. It is important that the choke means prevent any substantial reflection of the shock waves or pressure fronts within the shock tube and at the same time cause a predetermined pressure decay. This has been accomplished in the present invention by constructing the choke means of a series of wire screen layers with the mesh of each layer of screen becoming finer as the layers progress toward the discharge end of the shock tube. Accordingly, as the pressure front impinges upon and enters the choke means the pressure wave reflections progressively increase with each layer of wire screen. Accordingly, an unattenuated pressure wave reflection is realized only at the first screen layer, which reflects very little due to its large mesh, and the increased pressure wave reflections from the subsequent screen layers are attenuated internally within the choke means by back reflections off of previously impinged screen layers. Still other advantages have been accomplished in the present invention, such as mounting the explosive charge within the detonation chamber in a predetermined manner.

Accordingly, an object of the present invention is to provide a nuclear blast pressure simulator which overcomes all of the aforementioned disadvantages of prior art simulators;

Another object of the present invention is to provide an economical apparatus for producing long duration pressures with an ordinary explosive charge, which pressures simulate the pressures of a nuclear explosion;

Still another object is to provide a choke means at the discharge downstream end of a blast tube for minimizing reflected pressure waves and sustaining a predetermined pressure decay;

Still another object is to provide an apparatus for producing pressures in the order of 1000 p.s.i. and of a duration of 150 milliseconds in a relatively short blast tube with a minimum of reflected pressure wave fronts at the discharge end of said tube; and Yet another object of the present invention is to provide an economical nuclear blast pressure simulator which is economical to construct, economical to operate, and more nearly simulates the pressures of a nuclear blast.

Other objects, advantages and novel features of the invention will become apparent from the following detailed description of the invention when considered in conjunction with the accompanying drawings wherein:

FIG. 1 is a side elevational view of the present nuclear blast pressure simulator mounted in position of an earth surface;

FIG. 2 is a broken side view of the detonation chamber and the blast tube with portions of the detonation chamber and the blast tube shown in cross section;

FIG. 3 is a cross sectional view taken along plane III—III of FIG. 2;

FIG. 4 is a side view of the discharge downstream end of the blast tube and the choke means with the choke means and a portion of the discharge end shown in cross section;

FIG. 5 is a view taken along plane V—V of FIG. 4;

FIG. 6 is a view taken along plane VI—VI of FIG. 1; and

FIG. 7 is an isometric schematic illustration of another embodiment of the present invention;

Figure 8:
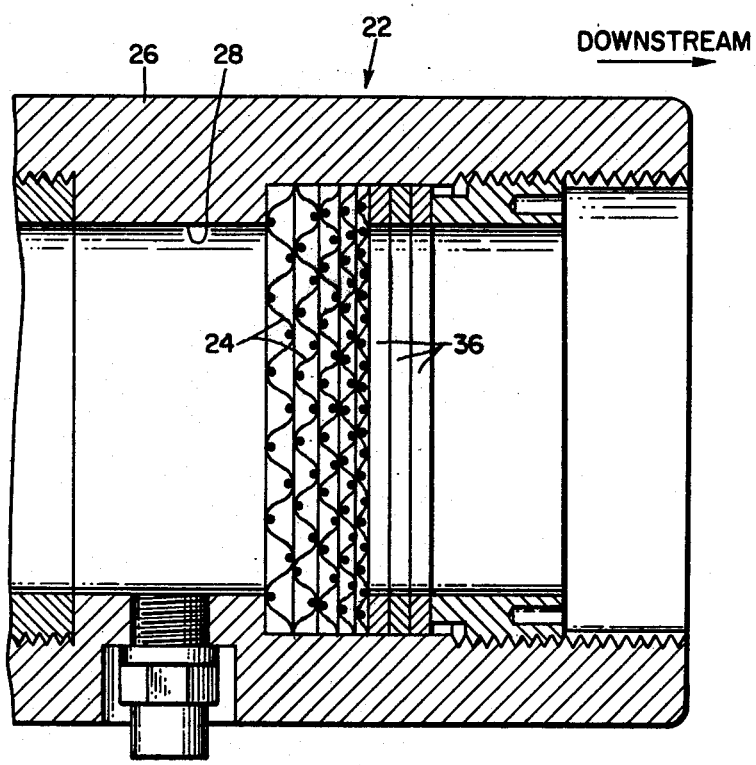
FIG. 8 is an enlarged view of the downstream end of FIG. 4.

Referring now to the drawings wherein like reference numerals designate like or similar parts throughout the several views there is shown in FIG. 1 a nuclear blast pressure simulator 10 which includes a detonation chamber 12 and a shock tube 14 with the forward upstream end of the shock tube being threaded into a discharge end of the detonation chamber 12. Disposed within the detonation chamber 12 is an explosive means 16 which, upon detonation, produces a high pressure over a relatively short duration within the detonation chamber. It is desirable that the high pressure of short duration in the detonation chamber appear in the shock tube 14 as a lower pressure over a long duration so as to simulate the blast pressures from a nuclear explosion. This has been accomplished by providing a perforated throttle plate 18 between the discharge end of the detonation chamber 12 and the upstream end of the shock tube 14.

As shown in FIG. 2 the throttle plate 18 is disposed with its planar surfaces substantially perpendicular to the longitudinal axis of the shock tube 14. As shown in FIG. 3, the throttle plate has a series of circular perforations 20 which are spaced from one another in a series of concentric rings about the center of the throttle plate 18. The circular shape of the perforations 20 enables the transfer of a pressure wave from the detonation chamber 12 to the shock tube 14 with a minimum of turbulence. The perforations 20 in adjacent rings are radially offset from one another and the perforations in alternate rings are radially aligned with one another. Accordingly, upon detonating the explosive means 16 a discrete pressure wavelet will emerge from each perforation 20 on the shock tube side of the throttle plate 18 and these pressure wavelets will expand to uniformly merge with one another, thereby forming in a shock tube a clean or substantially flat pressure front. The flatness of the pressure front more closely simulates the pressure conditions of a nuclear explosion and is important to the operation of the present invention. The flatness of the pressure front is further enhanced by making the perforations 20 in the outermost ring slightly larger than the perforations which are located in the rings inwardly thereof, as seen in FIG. 3. These larger perforations in the outer ring will at least partially compensate for the inherent lag of the extremities of a pressure front due to boundary layer drag at the interior walls of the shock tube 14.

The perforated throttle plate 18 may be connected between the detonation chamber 12 and the shock tube 14 in many different ways. One such connection is shown in FIG. 2 wherein the throttle plate 18 is shown disposed within a counterbore at the discharge end of the detonation chamber 12. The counterbore is provided with internal threads and the forward end of the shock tube 14 is threaded therein so as to tightly engage the throttle plate and hold it in snug engagement with the bottom end of the counterbore.

Another important consideration in simulating the pressures of a nuclear explosion within the shock tube 14 is to provide for a predetermined pressure decay within the tube with a minimum of pressure wave reflection or reflections at the downstream end of the tube. As seen in FIGS. 4 and 8, this has been accomplished by providing a choke means 22 attached to the downstream end of the shock tube 14 and having a series of wire screen layers 24 which are positioned transverse the longitudinal axis of the shock tube. The mesh of each wire screen layer 24 becomes finer as the layers progress in a downstream direction. Accordingly, the coarser upstream screen layer 24 reflects very little of the pressure wave within the shock tube 14 and the subsequent downstream screen layers 24 progressively reflect more of the pressure wave. Very little reflection is realized in the shock tube 14 from the subsequent wire screen layers 24 due to the fact that each reflection therefrom is partially reflected by all of the screen layers located upstream thereof. Accordingly, a pressure wave, upon incidence with the screen layers 24, will be substantially absorbed with very little reflection. By designing the wire screen layers 24 with a finer mesh as they progress in a downstream direction the desired pressure decay within the shock tube 14 may be attained.

The choke means 22, in addition to the wire screen layers 24, may include a choke housing 26. The choke housing 26 may be substantially tubular with a central bore 28 which is of substantially the same diameter as the internal diameter of the shock tube 14. The choke housing 26 may have an upstream counterbore which is threaded onto the discharge downstream end of the shock tube 14 and a set screw 30 may be provided for retaining the threaded position. Further, the choke housing 26 may have a downstream counterbore which is partially threaded, as shown in FIG. 4. The wire screen layers 24 may be disposed at the bottom end of the downstream choke housing counterbore and may be held tightly in place by a threaded retainer ring 32 which is threaded in the downstream counterbore. The retainer 32 may be provided with a plurality of end recesses 34 so that a tool may be inserted in the retainer for removal purposes. If desired a series of annular spacers 36 may be disposed between the retainer 32 and the wire screen layers 24.

The detonation chamber 12 may take many various shapes, however, it is preferable that it be elongated, as shown in FIGS. 1 and 2, with its longitudinal axis substantially aligned with the longitudinal axis of the shock tube 14. The detonation chamber 12 may include a pair of cylindrical-like shells 36 and 38, each of which may have a converging or tapered end portion. The larger end portions of the shells 36 and 38 may be joined together in alignment with one another by a nipple connector 40 which is threaded within each shell. If desired the larger ends of the shells 36 and 38 may be slightly counterbored so that O-rings 42 may be inserted therein for sealing purposes.

The explosive means 16, which is mounted within the detonation chamber 12, may include an elongated cylindrical explosive charge 44 which is disposed within a paper tube 46. The explosive material 44 may be incapsulated within the paper tube 46 by a pair of paper wads 48, each paper wad being recessed within the tube so as to provide a hollow open portion at both ends thereof.

In order to utilize the detonation chamber to its maximum strength limits and still obtain an optimum pressure therein it is desirable that the explosive charge 44 be mounted along the longitudinal axis of the detonation chamber 12. This may be accomplished by mounting the left end of the paper tube 46 to the converging end of the chamber shell 36 by a tube support 50 and an end plug 52. The tube support 50 may be generally cylindrical in shape with a reduced diameter portion inserted within the left end of the paper tube 46 and another reduced portion threaded within the end of the plug 52. The plug 52 may be threaded within the converging end of the chamber shell 36 so as to mount the left end of the paper tube 46 securely in place. The right end of the paper tube 46 may be connected to the throttle plate 18 by another tube support 54. The tube support 54 may be elongated with one end threaded centrally within the throttle plate 18 and with an opposite end inserted within the open right end portion of the paper tube 46. The latter end of the tube support 54 may be conical in shape so as to enable the paper tube 46 to be readily mounted thereon. The central location of the explosive charge 44 within the detonation chamber 12 enables the explosive pressure to be built up substantially uniformly within the detonation chamber upon detonation of the explosive charge.

The explosive charge 44 may be detonated by Primacord 56 which is located centrally within the explosive charge 44. A brass tube 58 may extend centrally through the plug 52, the tube support 50 and the paper tube 46 until it is substantially adjacent the left paper wad 48. The Primacord may extend through the paper wad 48 and the free end thereof may be inserted through a transverse aperture in the end portion of the brass tube 58. A plug of detonating material 60 may be disposed within the brass tube in contact wih the Primacord 56 and adjacent the detonating plug 60 may be an electric blasting cap 62. Connected to the electric blasting cap is an electric lead 64 which extends through the brass tube 58 and the plug 52 so that the lead may be connected to a power source (not shown) for detonation purposes. A seal may be provided between the electric lead 64 and the plug 52 by using an ignitor plug 66 which is threaded centrally within the plug 52 and sealingly receives the electric lead 64.

The explosive charge 44 may be any of the well known high yield explosives such as RDX or TNT. A mixture of ammonium nitrate, sodium nitrate, No. 2 fuel oil and TNT has been found very satisfactory and has been found safe to handle and easy to store.

Pressure readings may be taken within the shock tube 14 by a series of pressure transducers 68 which are threaded into the tube at spaced intervals therealong. If desired one of the transducers 68 may be threaded within the choke housing 26. The shock tube 14 may be all one piece or may be several shorter lengths of tubing which are conected together by a coupling 70, as shown in FIGS. 1 and 2.

Since the pressures within the nuclear blast pressure simulator 10 will be very high it is important that the simulator be tightly secured to some sort of a base or foundation. As shown in FIG. 1, the simulator 10 is secured to the surface of the earth in a horizontal fashion. This may be accomplished by using a series of pedestals 72 which rest upon concrete pads 74. Each pedestal 72 may have a centre upstanding portion 73 which engages the detonation chamber 12 and the shock tube 14 at spaced intervals therealong. Further, each pedestal has a U-shaped clamp 76 which is draped over the chamber 12 and tube 14 and is threadingly drawn tightly against the base of the pedestal 72 so as to clamp the chamber and the tube tightly against the upstanding pedestal portions. Further support is provided for the simulator 10 by a pair of tie rods 78, one on each side of the chamber 12 and one of which is shown in FIG. 1. The tie rod 78 is pivotally anchored at a lower end to a buried concrete deadman 80 and at an upper end is connected to the detonation chamber 12. The tie rods 78 may be connected to the detonation chamber 12 by a yoke 80, as seen in FIGS. 1, 2 and 6. The yoke 80 may have a central opening 82 for snugly receiving the nipple connector 40 and the connector 40 may have an annular flange 83 which is adapted to engage the yoke 80 and retain it in tight engagement with the larger end of the chamber shell 38 when the nipple connector 40 is threaded therein. The yoke 80 may have a pair of laterally spaced openings 84, each of which is adapted to receive a top end of a respective tie rod 78. As shown in FIG. 1, the upper end of each tie rod 78 may be connected to the yoke 80 by a bolt 86 and a bushing 88, the bushing 88 being threaded upon the bolt 86 and disposed within a respective yoke opening 84, and the bolt in turn being threaded within the upper end of a respective tie rod 78. Nuts may be threaded on the bolt on opposite sides of each bushing 88 so as to enable slight adjustments in the spacing of the detonation chamber 12 with respect to the deadman 80. Accordingly, upon detonating the explosive charge 44 the tendency of the simulator 10 to move to the left, as shown in FIG. 1, will be overcome by action of the pedestals 72 and the tie rods 78.

Upon operation of the nuclear blast pressure simulator 10, pressure in the order of 1000 p.s.i. over a duration of 150 milliseconds can be obtained in the shock tube 14. This has been accomplished with a detonation chamber 12 approximately 10 feet long and 9½ inches I.D. and a shock tube 14 approximately 18 feet long and 4½ inches I.D. The throttle plate 18 was 20% open, which is preferable, with approximately 12 concentric rings of circular perforations 20, each ring having approximately 36 perforations, with the perforations in the rings inward of the outermost ring being .125 inch in diameter and the perforations in the outermost ring being .187 inch in diameter. The concentric rings were spaced approximately .125 inch from one another.

FIG. 7 shows schematically how a plurality of the detonation chambers 12 could be employed in a nuclear blast pressure simulator 89 for making pressure studies within a test pit 90. The assembly may be supported on upstanding concrete spaced apart buried walls 92, which form the test pit 90, and an adjoining concrete pad 94. The simulator 89 may include a detonation chamber housing 96 which is neck down and joined to an elongated rectangular shock chamber 98, the shock chamber 98 being open at its bottom side so as to communicate with the test pit 90. The housing 96 may be provided with a throttle plate 100 which has a series of apertures at the discharge end of each of the detonation chambers 12, the configuration for these apertures being described hereinabove. At the downstream end of the shock chamber 98 a choke means 102 may be mounted and may have a plurality of wire screen layers which are constructed according to the principles described hereinabove. The chamber housing 96 may be secured in place by a pair of tie rods 104, one of these tie rods being shown in FIG. 7. The upward force which will be exerted on the shock chamber 89 may be restrained by a reaction frame 106 which is bolted to a pair of anchor assemblies 108. The anchor assemblies may be held fast in the ground by a pair of concrete deadmen (not shown). Accordingly, upon detonating the explosive charges within the detonation chambers 12 an increased pressure is obtained within the shock chamber 98. This pressure will be realized within the test pit 90 and structural configurations may be disposed within this pit for test purposes.

It is now readily apparent that the present invention provides a nuclear blast pressure simulator which has many advantages over prior art simulators. By throttling the high pressure, short duration explosive pressure within the detonation chamber 12 a lower pressure and longer duration pressure may be realized within the shock tube 14. By configuring the throttle plate 18 in a novel fashion, as described hereinabove, a clean pressure front is obtained within the shock tube 14. These results are obtained with a shock tube of a surprisingly short length. Further, the choke means 22 of the present invention enables a predetermined pressure decay within the shock tube with a minimum of pressure front reflections at the downstream end of the tube. These and other advantages of the present invention have provided a nuclear blast pressure simulator which has capabilities not heretofore realized in the prior art.

Obviously many modifications and variations of the present invention are possible in the light of the above teachings. It is therefore to be understood that within the scope of the appended claims the invention may be practiced otherwise than as specifically described.

I claim:
1. A nuclear blast pressure simulator for producing long duration pressures with an ordinary explosive charge comprising:
  a detonation chamber wherein the explosive charge can be detonated to produce high pressure of relatively short duration;
  a shock tube having an upstream end connected to and opening into said detonation chamber;
  a perforated throttle plate connected between the detonation chamber and the shock tube with the plate positioned substantially transverse to said shock tube; and
  said perforated throttle plate has an outermost series of perforations which are larger than a series of perforations located inwardly thereof,
whereby the extremely high and short duration pressures, in passing through the throttle plate, produce lower pressures of a longer duration with a flat pressure front within said shock tube.

2. A simulator as claimed in claim 1 wherein:
  the perforations in said throttle plate are circular in shape.

3. A simulator as claimed in claim 1 including:
  an elongated explosive charge mounted within said detonation chamber with one end connected to the center of said throttle plate.

4. A simulator as claimed in claim 1 including:
  choke means mounted at a downstream discharge end of said shock tube, said choke means including a series of wire screen layers which are positioned transverse said shock tube.

5. A simulator as claimed in claim 4 wherein:
  the mesh of the wire screen layers becomes finer as the layers progress in a downstream direction.

6. A nuclear blast pressure simulator for producing long duration pressures with an ordinary explosive charge, which pressures simulate the pressures of a nuclear explosion comprising:
  a detonation chamber wherein the explosive charge can be detonated to produce extremely high pressures of relative short duration;
  a shock tube having an upstream end connected to and opening into said detonation chamber;
  a throttle plate connected between the detonation chamber and the shock tube with the plate positioned substantially transverse to said shock tube;
  said throttle plate having circular perforations which are spaced from one another in a series of concentric rings about the center of said plate;
  the perforations in adjacent rings being radially offset from one another and the perforations in alternate rings being radially aligned with one another; and
  the perforations in an outermost ring being slightly larger than the perforations which are located in the rings inwardly thereof
whereby the extremely high and short duration pressures, in passing through the throttle plate, produce a flat shock wave in the shock tube which is followed by lower pressures of longer duration.

7. A simulator as claimed in claim 6 including:
  a choke means mounted at a downstream discharge end of said shock tube, said choke means including a series of wire screen layers which are positioned transverse said shock tube.

8. A simulator as claimed in claim 7 wherein:
  the mesh of the wire screen layers becomes finer as the layers progress in a downstream direction.

9. A nuclear blast pressure simulator for producing long duration pressures with an ordinary explosive charge, which pressures simulate the pressures of a nuclear explosion comprising:
  an elongated detonation chamber wherein the explosive charge can be detonated to produce extremely high pressures of relatively short duration;
  a shock tube having an upstream end connected to and opening into said detonation chamber, the longitudinal axis of the detonation chamber and the shock tube being substantially coextensive;
  a throttle plate connected between the detonation chamber and the shock tube with the plate positioned substantially transverse to said shock tube;
  said throttle plate having circular perforations which are spaced from one another in a series of concentric rings about the center of said plate;
  the perforations in adjacent rings being radially offset from one another and the perforations in alternate rings being radially aligned with one another; and
  the perforations in an outermost ring being slightly larger than the perforations which are located in the rings inwardly thereof
whereby the extremely high and short duration pressures, in passing through the throttle plate, produce a flat shock wave in the shock tube which is followed by lower pressures of longer duration.
  a choke means mounted at a downstream discharge end of said shock tube, said choke means including a series of wire screen layers which are positioned transverse said shock tube;
  the mesh of the wire screen layers becoming finer as the layers progress toward the discharge end of the shock tube; and
  an elongated explosive charge mounted within said detonation chamber in an aligned relationship with one end of the charge connected to the center of said throttle plate.

10. In a nuclear blast pressure simulator having a detonation chamber and a shock tube connected at its upstream end to the detonation chamber, a choke for attenuating pressure waves at a downstream end of the shock tube comprising:
  a series of wire screen layers;
  means for mounting said wire screen layers at a downstream end of the shock tube with the layers positioned substantially transverse thereof; and
  the mesh of the wire screen layers becoming finer as the layers progress in a downstream direction.

References Cited

UNITED STATES PATENTS

| | | | |
|---|---|---|---|
| 2,570,129 | 10/1951 | Johnson | 73—147 |
| 2,636,572 | 4/1953 | Fleisher | 183—69 |
| 2,677,231 | 5/1954 | Cornelius | 181—46 |
| 2,720,276 | 10/1955 | Droeler | 181—46 |
| 2,805,571 | 9/1957 | Graham | 73—147 |
| 2,975,632 | 3/1961 | Ganahl | 73—147 |
| 3,055,212 | 9/1962 | Mackey | 73—147 |
| 3,109,305 | 11/1963 | Kigmer et al. | 73—147 |
| 3,236,263 | 2/1966 | Holder | 138—45 |
| 3,184,955 | 5/1965 | Filler | 73—12 |
| 3,248,924 | 5/1966 | Boynton | 73—12 |
| 3,260,103 | 7/1966 | Johnson | 73—12 |
| 3,318,144 | 5/1967 | Duff | 73—12 |
| 3,326,033 | 6/1967 | Stephenson et al. | 73—12 |

RICHARD QUEISSER, Primary Examiner

J. K. LUNSFORD, Assistant Examiner

U.S. Cl. X.R.

73—12, 167